United States Patent

[11] 3,612,872

| [72] | Inventors | Robert J. Omohundro<br>Washington, D.C.;<br>Frank A. Marchetti, Hillcrest Heights, Md. |
|---|---|---|
| [21] | Appl. No. | 827,699 |
| [22] | Filed | May 26, 1969 |
| [45] | Patented | Oct. 12, 1971 |
| [73] | Assignee | The United States of America as represented by the Secretary of the Navy |

[54] SELECTIVE DETECTOR FOR FISSION NEUTRONS
5 Claims, 2 Drawing Figs.

| [52] | U.S. Cl. | 250/83.1, 250/83.3 |
|---|---|---|
| [51] | Int. Cl. | G01t 3/00 |
| [50] | Field of Search | 250/83.1, 83.3 |

[56] References Cited
UNITED STATES PATENTS

| 3,167,654 | 1/1965 | Scott | 250/83.3 X |
| 3,225,200 | 12/1965 | Gey et al. | 250/83.1 |
| 3,413,473 | 11/1968 | Mills, Jr. | 250/83.3 |

*Primary Examiner*—Archie R. Borchelt
*Attorneys*—R. I. Tompkins, Arthur L. Branning and R. J. Erickson ABSTRACT: The invention distinguishes fissionable neutron sources from nonfissionable sources by utilizing the principle that only a fissionable source emits simultaneously a plurality of neutrons during a single fission event. The simultaneously emitted neutrons are counted in a first coincidence circuit together with random pulses from neutrons emitted by $\alpha,n$ reactions. A second coincidence circuit counts only those neutrons which were emitted separately at spaced intervals of time by $\alpha,n$ reactions and does so by including a delay device in one leg of the coincidence circuit to throw out of coincidence the pulses from the simultaneously emitted neutrons.

INVENTOR
ROBERT J. OMOHUNDRO
FRANK A. MARCHETTI

BY
ATTORNEY

3,612,872

SELECTIVE DETECTOR FOR FISSION NEUTRONS

STATEMENT OF GOVERNMENT INTEREST

The invention described herein may be manufactured and used by or for the Government of the Unite States of America for governmental purposes without the payment of any royalties thereon or therefor.

BACKGROUND OF THE INVENTION

The present invention relates generally to the detection of neutrons and more particularly to a new and improved neutron-detecting device having the capability of reliably distinguishing whether the detected neutrons were emitted by a fissionable or nonfissionable radioactive source.

Numerous occasions arise both in the laboratory and in the field requiring the identification of unknown radioactive materials as being fissionable or nonfissionable. It has only been in recent years that a feasible method has been known to make such an identification, that method being described in U.S. Pat. No. 3,225,200. The device of the patent operates on the principle that a fissionable source simultaneously emits a plurality of neutrons during a single fission event in addition to single neutrons released by $\alpha,n$ reactions; while a nonfissionable source never emits more than a single neutron at any one time. Due to the design of standard neutron detectors, the simultaneously emitted neutrons appear at the output of the detector as a train of closely spaced pulses. In the patented device, a first counter is coupled directly to a detector while a second counter has a delay device interposed between it and the detector. The delay device functions to blank-out the second counter for a fixed interval of time after each pulse, that interval being longer than the duration of any pulse train, so that the second counter registers only a single count for a pulse train and a single count for a random pulse. The first counter however counts all random pulses and all pulses in the pulse trains. If both counters register approximately equal, the source is determined to be nonfissionable but, if the first counter registers a higher count than the second counter, the source is known to be fissionable. Although the patented device would appear to operate satisfactorily at low emission rates, the design is such as to be inherently unsuitable for use with hot radioactive sources, i.e., those having high-neutron emission rates. When monitoring a hot nonfissionable source, the delay device of the patent will cause the second counter to miss pulses during the periods when the second counter is blanked-out and the two counters would register different counts, thus giving an erroneous indication.

SUMMARY OF THE INVENTION

The general purpose of the present invention is to provide a new and improved fission neutron detector which possesses all of the advantages of previous devices but none of the aforedescribed disadvantages. To accomplish this, the present invention contemplates the use of a pair of coincidence circuits for counting pulses produced by a neutron detector upon capture of neutrons. The first coincidence circuit counts each pulse of a pulse train produced by those neutrons simultaneously emitted from a fissionable source and also counts any random pulses produced by neutrons from $\alpha,n$ reactions. The second coincidence circuit has a delay device in one leg thereof to throw the pulse trains out of coincidence and thus permits the second counter to count only those pulses from nonfission events. Since the delay device in the second coincidence circuit does not blank-out the counter, but instead functions to momentarily store the pulses so that the pulse trains are thrown out of coincidence while counting every random pulse, the device of this invention provides reliable indications at all count rates.

OBJECTS OF THE INVENTION

It is therefore an object of the present invention to provide a new and improved neutron detector capable of distinguishing fissionable sources from nonfissionable sources.

Another object of the invention is to provide an improved fission neutron detector which will operate accurately and reliably with all neutron sources independently of their neutron emission rate.

A further object of the invention is to provide a selective detector for fission neutrons which will provide an accurate indication after counting neutrons for only a short period of time.

BRIEF DESCRIPTION OF THE DRAWINGS

These and other objects and advantages of the description of the preferred embodiments thereof when considered in conjunction with the accompanying drawings wherein.

DESCRIPTION OF THE PREFERRED EMBODIMENTS

Figure 1:
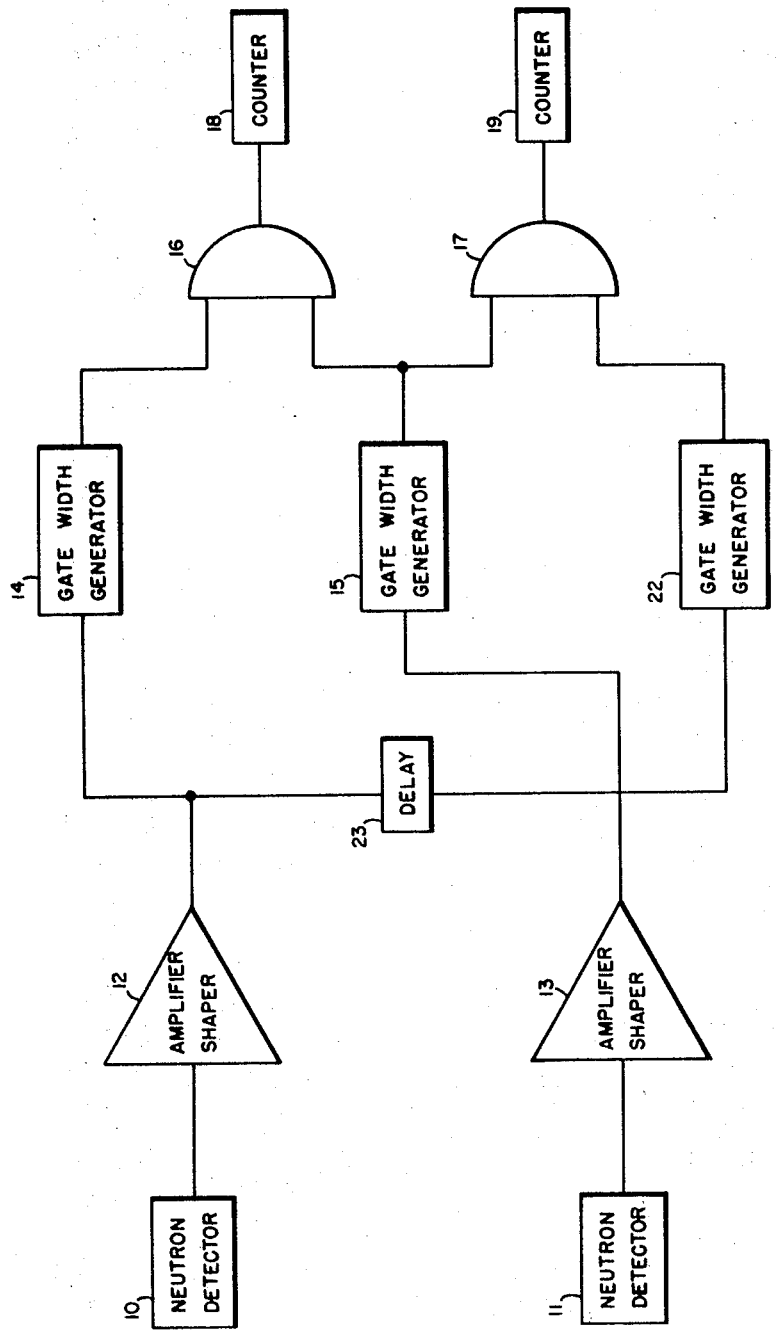
FIG. 1 illustrates the circuit of one embodiment of the invention in block diagram form.

Referring now to FIG. 1, there is shown a first neutron detector 10 and a second neutron detector 11, which may for example be of the boron trifluoride type suspended in paraffin. These detectors function in their well-known manner to produce an electrical pulse each time the detector is irradiated with a neutron and, when a plurality of neutrons are simultaneously emitted during a single fission event, these detectors produce a plurality of closely spaced pulses in the form of a pulse train. The outputs of the detectors 10 and 11 are coupled respectively to a pair of pulse shapers and amplifiers 12 and 13 which prepare the signals for further processing. The output of detector 11 is coupled through amplifier shaper 13 to a gate width generator 15 which, when triggered by a pulse from detector 11, provides an enabling pulse of predetermined duration to one input of AND gate 16 and also to one input of AND gate 17. The output of AND gate 16 is coupled to a first counter 18 while the output of AND gate 17 is coupled to a second counter 19.

The output of detector 10 is coupled through the amplifier shaper 12 to a gate width generator 14 and then to the second input of AND gate 16. Detector 10 is also coupled to a gate width generator 22 and then to AND gate 17 however, a delay device 23 is interposed between the amplifier 12 and the gate width generator 22. Thus, the outputs of the detectors are processed by two coincidence circuits, the first coincidence circuit being defined by AND gate 16 and the gate width generators 14 and 15 while the second coincidence is defined by AND gate 17, gate width generators 15 and 22, and delay 23. The gate width generators may be selected to provide enabling pulses of predetermined duration, and since all of the neutrons which are simultaneously emitted from a fissionable source are normally detected within a period of 200 microseconds, it is convenient to set the three gate width generators to produce enabling pulses having a duration of 200 microseconds.

The arrangement of the first coincidence circuit is such that counter 18 will count every pulse which is produced by the neutron detectors, whether the pulses be single pulses produced by neutrons released by $\alpha,n$ reactions or whether the pulses be a plurality of pulses in a pulse train produced by neutrons emitted by a fission event. The second coincidence circuit is designed such that the counter 19 will count all pulses other than those pulses which are present in the pulse trains produced by simultaneously emitted neutrons. This result is achieved by including the delay device 23 in one leg of the second coincidence circuit and having no delay in either leg of the coincidence circuit associated with counter 18. Since the gate width generators produce enabling pulses of 200 microseconds in response to each triggering pulse, the delay device 23 may be selected to store each pulse for 500 microseconds before releasing the pulse to the gate width generator 22. With this timing arrangement, it will be seen that every pulse produced by the detectors 10 and 11 arrives simultaneously at the gate 16 and is registered in counter 18, and that the delay device 23 functions to throw the time coincidence pulses out of coincidence so that they do not arrive at the gate 17 simultaneously and therefore are not registered in counter 19. It will therefore be seen that counter 18 starts counting immediately and counts each and every pulse produced by the detectors but, due to the presence of the delay device 23 in one leg of the coincidence circuit associated with counter 19, it will be seen that counter 19 does not begin counting until 500 microseconds after the first pulse produced by the detector. Each subsequent pulse is also delayed 500 microseconds by the delay device 23. If a pulse train were present in the coincidence associated with counter 19, that pulse train would have a maximum duration of 200 microseconds and therefore would no longer be present at gate 17 when the corresponding pulse in the other leg of the coincidence circuit, which had been delayed by device 23, arrived at the gate 17. Those pulses passing through delay 23 thus trigger the gate width generator 22 to enable gate 17 during an interval of time subsequent to the presence of its corresponding pulse to gate 17 and hence the delayed enabling pulses permit the gate to pass only those pulses which are born subsequent to the enabling pulse. Counter 19 therefore registers only those random pulses produced by $\alpha,n$ reactions and does not register the pulse trains. Probabilities show that it is extremely unlikely that a pulse train from a fission event will be present in one leg of the coincidence circuit associated with gate 17 during the interval of time that the gate is enabled by a previously born delayed pulse. Therefore, when the device of this invention is used to detect neutrons from a fissionable source, counter 18 will register a much higher number of counts than counter 19 during a counting period of only a few minutes. Moreover, when the device of this invention is used to detect neutrons from a nonfissionable source, counters 18 and 19 will register substantially identical counts throughout the counting period. Thus, this invention provides an accurate and reliable means of determining whether a radioactive source is fissionable or nonfissionable. Moreover, this device has been found to work equally well with radioactive sources having high as well as low-neutron emission rates.

Figure 2:
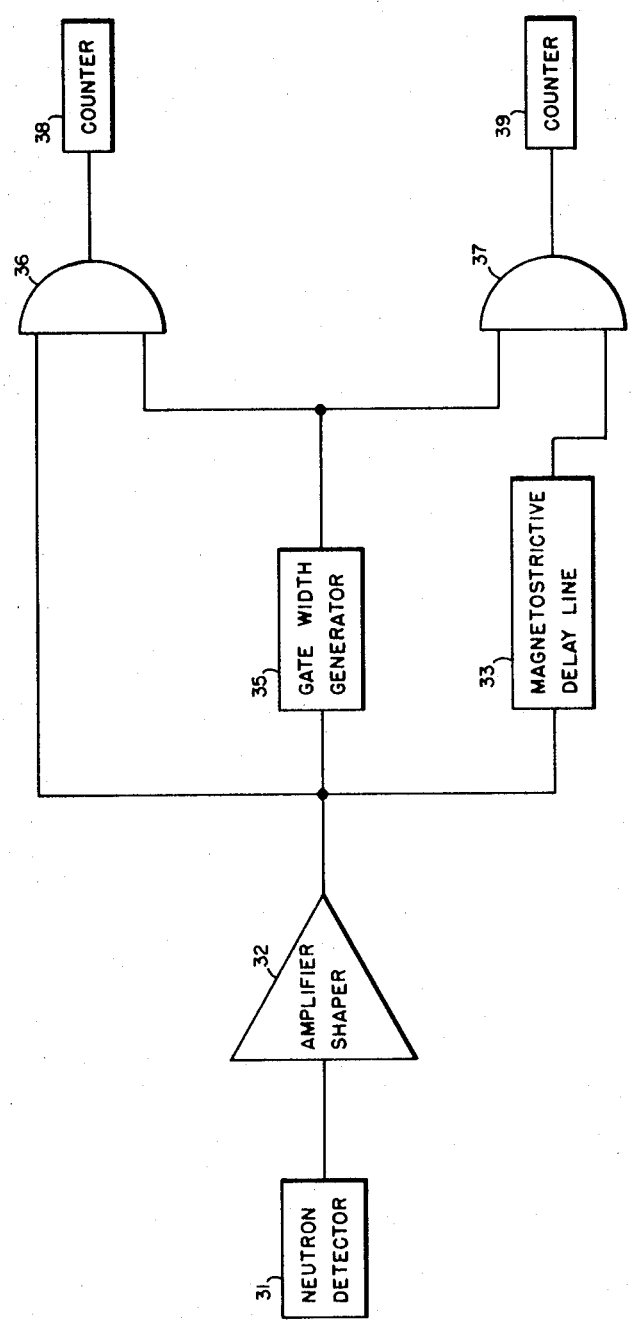
FIG. 2 illustrates the circuit of a second embodiment of the invention in block diagram form.

Referring now to FIG. 2, there is shown a second embodiment of this invention which includes a neutron detector 31, the output of which is coupled to a pulse amplifier shaper 32. The output of the pulse amplifier shaper is coupled to one input of a first AND gate 36, to a gate width generator 35, and to a magnetostrictive delay line 33. The output of the gate width generator 35 is coupled to the second input of AND gate 36 and to a first input of AND gate 37, while the output of the delay line 33 is coupled to the second input of the AND gate 37. The output of gate 36 is coupled to a first counter 38 while the output of gate 37 is coupled to a second counter 39. The gate width generator provides a common input to both AND gates and thus forms a common leg of two coincidence circuits each associated with a respective AND gate and counter. The operation of the embodiment shown in FIG. 2 is similar to that illustrated in FIG. 1 in that counter 38 will register every pulse produced by the detector including each pulse of the pulse trains produced by fission events and each pulse from the random $\alpha,n$ reactions, while the magnetostrictive delay line 33 functions to throw the time coincident pulses out of coincidence such that the pulse trains are prevented from being registered on counter 39 so that counter 39 registers only those random pulses occurring as a result of $\alpha,n$ reactions. Therefore, a nonfissionable radioactive source will produce substantially identical counts in counters 38 and 39 while a fissionable source will cause counter 38 to register a much larger count than that registered in counter 39.

It may therefore be seen that the present invention provides a simple and reliable device for determining whether a radioactive source is fissionable or nonfissionable. This device operates more accurately and reliably than previously known devices, even with high emission rate sources. The device of this invention also provides a reliable indication of the neutron source after counting neutrons for only a short period of time.

Obviously many modifications and variations of the present invention are possible in light of the above teachings. For example, with properly chosen sensors, the principles utilized in the present invention can distinguish certain other types of nuclear disintegrations in which two or more particles and/or rays of electromagnetic radiation are emitted in time coincidence such as $(\beta,\gamma)$ events and multiple gamma ray emission. It is therefore to be understood that the invention may be practiced otherwise than as specifically described.

What is claimed and desired to be secured by letters patent of the United States is:

1. A selective detector for fission neutrons comprising:
neutron detector means for producing an electrical pulse in response to irradiation by a neutron;
a first pulse counting circuit coupled to said detector means and including a first counter for counting every pulse produced by said detector means, wherein said first circuit includes a first AND gate having first and second inputs coupled to said detector means and an output coupled to said first counter; and
a second pulse counting circuit coupled to said detector means and including a second counter and a pulse delay device coupled between said detector means and said second counter to permit the second counter to count only those pulses produced by neutrons which are emitted separately at spaced intervals of time,
wherein said second circuit includes a second AND gate having a first and second inputs coupled to said detector means and an output coupled to said second counter, and wherein said delay device is coupled between said detector means and one of the inputs of said second gate.

2. The device of claim 1 further comprising:
gate width generator means coupled to one of said inputs of said first AND gate and to the other of said inputs to said second AND gate.

3. The device of claim 2 further comprising:
a pulse amplifier and shaper coupled to the output of said detector means for shaping and amplifying the signals to said first and second counting circuits.

4. The device of claim 1 further comprising:
gate width generator means coupled to each input of both AND gates for enabling the AND gates for a preselected interval of time following arrival of a pulse at said gate width generator means.

5. The device of claim 4 further comprising:
a pulse amplifier and shaper coupled between said detector means and said gate width generator means.